United States Patent
Lu

(10) Patent No.: US 6,236,865 B1
(45) Date of Patent: May 22, 2001

(54) OPERATING A CELLULAR TELECOMMUNICATION SYSTEM

(75) Inventor: Kang Lu, Kornwestheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/385,637

(22) Filed: Aug. 27, 1999

(30) Foreign Application Priority Data

Jun. 18, 1999 (EP) ................................. 99 440 154

(51) Int. Cl.$^7$ ................ H04Q 7/30; H04B 1/00; H04B 7/216
(52) U.S. Cl. ............ 455/522; 455/436; 455/442; 455/517; 455/524; 455/525; 455/69; 370/332
(58) Field of Search ................... 455/436, 442, 455/453, 522, 68, 69, 13.4, 38.3, 135, 500, 226.1–226.2, 517, 524, 525; 370/332

(56) References Cited

U.S. PATENT DOCUMENTS

| | | | |
|---|---|---|---|
| 5,056,109 | * 10/1991 | Gilhousen et al. | 455/69 |
| 5,267,262 | * 11/1993 | Wheatley, III | 455/38.3 |
| 5,530,917 | * 6/1996 | Andersson et al. | 455/38.3 |
| 5,559,790 | * 9/1996 | Yano et al. | 455/69 |
| 5,640,414 | * 6/1997 | Blakeney, II et al. | 455/436 |
| 5,710,981 | * 1/1998 | Kim et al. | 455/69 |
| 5,845,212 | * 12/1998 | Tanaka | 455/522 |
| 5,884,187 | * 3/1999 | Ziv et al. | 455/69 |
| 5,933,782 | * 8/1999 | Nakano et al. | 455/522 |
| 5,982,760 | * 11/1999 | Chen | 455/552 |
| 6,119,018 | * 9/2000 | Kondo | 455/522 |

FOREIGN PATENT DOCUMENTS

| | | |
|---|---|---|
| 0 680 160 A2 | 11/1995 | (EP) . |
| WO 98/56120 | 12/1998 | (WO) . |
| WO 98/56200 | * 12/1998 | (WO) ..... H04Q/7/30 |

* cited by examiner

*Primary Examiner*—Lee Nguyen
*Assistant Examiner*—Simon Nguyen
(74) *Attorney, Agent, or Firm*—Sughrue, Mion, Zinn, Macpeak & Seas, PLLC

(57) ABSTRACT

A method of operating a cellular telecommunication system is described, wherein one mobile station (10) communicates with a number of base stations (BTS1, BTS2, BTS3) in a macrodiversity mode, and wherein each of the base stations (BTS1, BTS2, BTS3) receives a transmission power control (TPC) signal from the mobile station (10) requesting an increase or a decrease of the transmission power levels. A primary signaling signal (23) is created by the mobile station (10) indicating that one (BTS3) of the base stations (BTS1, BTS2, BTS3) from which the mobile station (10) receives a signal (17, 18, 19) with the highest signal quality. The primary signaling signal (23) is sent from the mobile station (10) to the base stations (BTS1, BTS2, BTS3). The transmission power levels of the base stations (BTS1, BTS2, BTS3) are increased and/or decreased depending on the primary signaling signal (23).

20 Claims, 2 Drawing Sheets

OPERATING A CELLULAR TELECOMMUNICATION SYSTEM

BACKGROUND OF THE INVENTION

The invention relates to a method of operating a cellular telecommunication system wherein one mobile station communicates with a number of base stations in a macrodiversity mode, and wherein each of the base stations receives a transmission power control signal from the mobile station requesting an increase or a decrease of the transmission power levels. The invention also relates to a corresponding cellular telecommunication system.

In Direct Sequence Code Division Multiple Access (DS-CDMA) cellular telecommunication systems, a mobile station communicates in a so-called macrodiversity mode with a number of base stations. In order to keep the signal qualities of the CDMA signals received by the mobile station from the base stations as constant as possible and at least similar, an inner-loop transmission power control is established. This control creates transmission power control (TPC) signals which are sent from the mobile station to the different base stations. Due to different propagation conditions, e.g. different distances between the base stations and the mobile station, these TPC signals are often received or detected incorrectly by the base stations. This has the consequence that the transmission power levels of the base stations drift apart over the time which is called the random walking problem.

SUMMARY OF THE INVENTION

It is an object of the invention to provide a method for operating a telecommunication system which ensures that the transmission power levels of the base stations do not drift apart.

For a method as described above, this object is solved according to the invention in that a primary signaling signal is created by the mobile station indicating that one of the base stations from which the mobile station receives a signal with the highest signal quality, that the primary signaling signal is sent from the mobile station to the base stations, and that the transmission power levels of the base stations are increased and/or decreased depending on the primary signaling signal. For a telecommunication system as decribed above, this object is solved accordingly by the invention.

On the basis of the primary signaling signal, the base stations are able to check which one of them sends the signal with the highest signal quality. This so-called primary base station changes, i.e. increases or decreases its transmission power levels differently compared to the other base stations. This different change has the consequence that a kind of "power race" is performed by the base stations in which different ones of the base stations may become the primary base station. This consecutive change of the primary base station results in the fact that the transmission power levels of the base stations do not drift apart but remain within only small variations. The random walking problem, therefore, is not present anymore.

In an advantageous embodiment of the invention, the transmission power level of that base station being indicated by the primary signaling signal, is decreased by a greater value than the transmission power level of other base stations. In another advantageous embodiment of the invention, the transmission power level of that base station being indicated by the primary signaling signal, is increased by a smaller value than the transmission power level of other base stations.

Both embodiments ensure that the transmission power level of the primary base station is changed in such a manner that—at least after a while—the transmission power level of another base station becomes greater so that this other base station becomes the new primary base station. The "power race" between the base stations is thereby guaranteed with the result that the transmission power levels of the base stations remain about the same and do not drift apart.

It is advantageous when the primary signaling signal is created by comparing the signals received from the base stations. Furthermore, it is advantageous when the signals are compared before being combined. These features provide a fast and simple way to create the primary signaling signal in the mobile station.

BRIEF DESCRIPTION OF THE DRAWING

Further embodiments as well as further advantages of the invention are outlined in the following description of the enclosed figures.

DETAILED DESCRIPTION OF THE INVENTION

In a Direct Sequence Code Division Multiple Access (DS-CDMA) cellular telecommunication system, one and the same mobile station (MS) may communicate with a number of base stations (BTS) at the same time in a so-called macrodiversity mode. However, due to different propagation conditions, e.g. due to different distances of the base stations from the mobile station, it is possible that the signal quality of the different signals transmitted from the base stations to the mobile station are also different. This has the consequence that the mobile station only receives those signals with the higher signal quality from the closer base station and suppresses signals with lower signal quality sent from more distant base stations.

In order to overcome this Near/Far-Effect, transmission power control methods are used with the goal to influence all transmitted signals such that the signal qualities of all signals are similar at the mobile station.

In an inner-loop transmission power control method a current signal-to-interference ratio (SIR) value of a combined CDMA signal received from every one of the number of base stations is measured by the mobile station. Then, the measured SIR value is compared to a target SIR value and a transmit power control (TPC) signal is generated using a TPC algorithm. This same TPC signal is transmitted as control data of the CDMA signal from the mobile station back to all base stations. Then, the transmission power levels of these base stations are adjusted according to the received TPC signal, i.e. the transmission power levels of the base stations are increased ("TPC up") or decreased ("TPC down").

Due to the above mentioned different propagation conditions, e.g. due to different distances between the base stations and the mobile station, as well as due to other different system parameters of the respective base staions, it is possible that the TPC signal sent by the mobile station is received or detected incorrectly by one of the base stations. This has the consequence that the transmission power levels of the number of base stations drift apart after a while. This is called the random walking problem.

Figure 1:
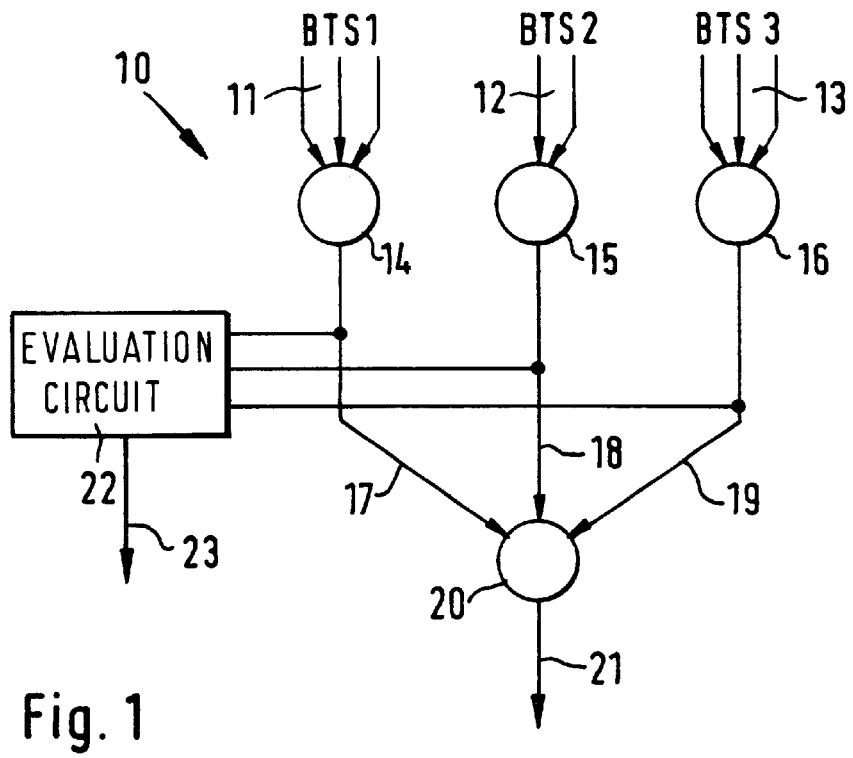
FIG. 1 shows a schematic block diagram of an embodiment of a part of a mobile station according to the invention.

FIG. 1 shows a part of a mobile station 10 which is coupled in the macrodiversity mode with three base stations BTS1, BTS2, BTS3. The mobile station 10 therefore receives the CDMA signals 11, 12, 13 of these three base stations BTS1, BTS2, BTS3 as input signals. The paths of each of these CDMA signals 11, 12, 13 are combined in blocks 14, 15, 16 to form combined CDMA signals 17, 18, 19 of the respective base stations BTS1, BTS2, STS3. These CDMA signals 17, 18, 19 are once more combined in a block 20 to establish a final CDMA signal 21 for the mobile station 10.

The CDMA signals 17, 18, 19 of the respective base stations BTS1, BTS2, BTS3 are provided to a signal quality evaluation circuit 22 which compares the received CDMA signals 17, 18, 19 with each other. Then, the signal quality evaluation circuit 22 creates a primary signaling signal 23 which identifies that base station from which the mobile station 10 currently receives a CDMA signal with the highest signal quality. This means in other words that the CDMA signal 17, 18, 19 with the highest signal quality is evaluated and the primary signaling signal 23 is created identifying that one of the base station BTS1, BTS2, BTS3 which has sent this highest quality CDMA signal.

For example, the CDMA signal 19 has the highest signal quality of all three CDMA signals 17, 18, 19 received from the base stations BTSl, BTS2, BTS3. This CDKA signal 19 was sent by the base station BTS3. Therefore, the primary signaling signal 23 created by the signal quality evaluation circuit 22 includes an identification of the base station BTS3, e.g. an identification number or the like of this base station BTS3.

The primary signaling signal 23 is sent from the mobile station 10 back to the three base stations BTS1, BTS2, BTS3 as control data of the respective CDMA signals. As a consequence, the base stations BTS1, BTS2, BTT3 are able to check which one of them sends the CDMA signal with the highest signal quality. This base station, in the above example the base station BTS3, is called the current or instantaneous primary base station.

As already outlined, the mobile station 10 also sends TPC signals back to the three base stations BTS1, BTS2, BTS3. Depending on these TPC signals, the base stations BTS1, BTS2, BTS3 increase or decrease their transmission power levels. The TPC signals are sent with a higher frequency from the mobile station 10 to the base stations BTS1, BTS2, BTS3 compared to the frequency of the creation of the primary signaling signal 23. There is only one primary signaling signal 23 which is sent to all three base stations BTS1, BTS2, BTS3.

Figure 2:
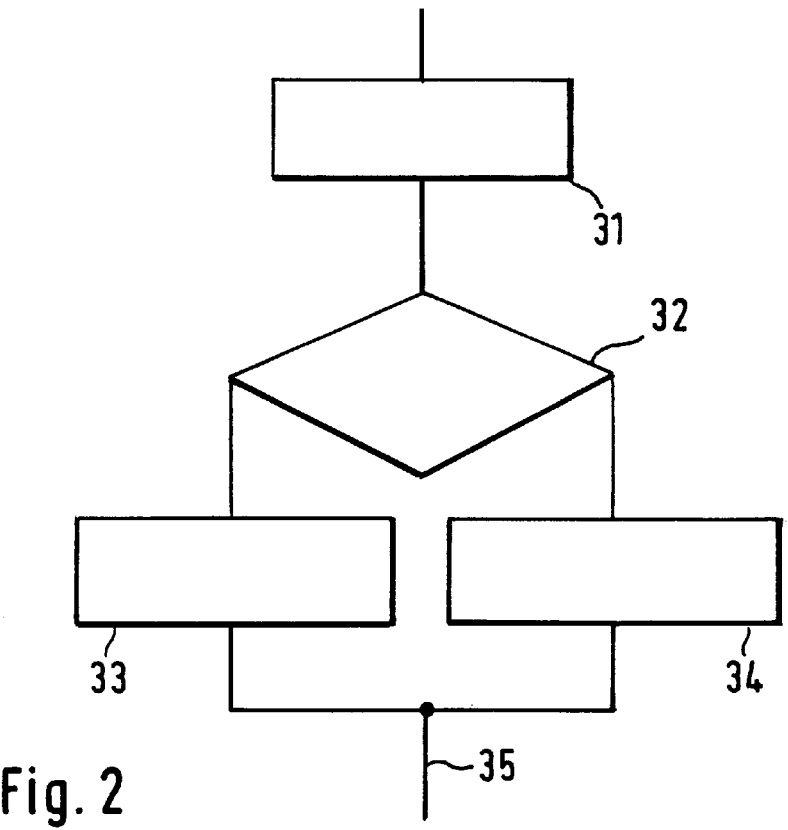
FIG. 2 shows a schematic block diagram of an embodiment of an inner-loop transmission power control method according to the invention.

FIG. 2 shows a method of operating the base stations BTS1, BTS2, BTS3 depending on the TPC signal and the primary signaling signal 23. The shown method is realized in each of the three base stations BTS1, BTS2, BTS3. In the following description, the method is realized within the base station BTS3 as an example.

In a block 31, the base station BTS3 receives a TPC signal from the mobile station 10 indicating that the transmission power level has to be decreased, i.e. "TPC down". Then, in a block 32, it is checked whether the base station BTS3 is the current primary base station. This is done e.g. by comparing the current primary signaling signal with the identification of the base station BTS3.

If the base station BTS3 is the current primary base station, then the transmission power level is decreased by a first value V1 in a block 33, e.g. by a step size of 0.8 dB. However, if the base station BTS3 is not the current primary base station, then the transmission power level is decreased by a second value V2 in a block 34, e.g. by a size of 0.5 dB. The first value V1 is greater than the second value V2.

If the base station BTS3 receives a TPC signal indicating that the transmission power level has to be increased, i.e. "TPC up", then this power level is increased by the first value V1, e.g. a step size of 0.5 dB.

Then, a CDMA signal 35 is sent from the respective base station BTSl, BTS2, BTS3 to the mobils station 10 with a transmission power level being increased or decreased by the respective step sizes. In the following description, the different base stations BTS1, BTS2, BTS3 transmit the CDMA signals 35', 35'', 35'''.

Figure 3:
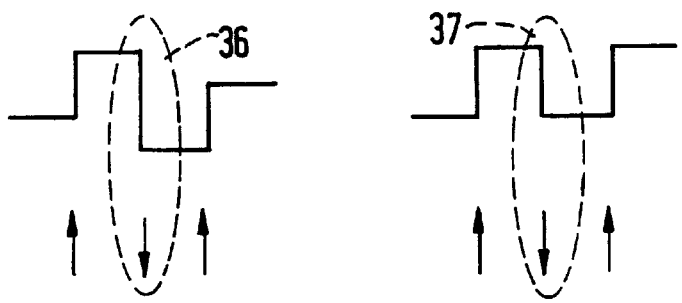
FIG. 3 shows a schematic time diagram of transmission power levels of two base stations operating according to the method of FIG. 2.

FIG. 3 shows the consequences of the method described in connection with FIG. 2. In the upper part of FIG. 3, the transmission power levels of one of the base station BTSl, BTS2, BTS3 are shown as an example. The corresponding TPC signals are shown as arrows in the lower part of FIG. 3.

In the left part of FIG. 3, the respective base station is assumed to be the current or instantaneous primary base station. This results in increases of the transmission power levels by 0.5 dB triggered by "TPC up" signals. As indicatied by a reference numeral 36, a "TPC down" signal, however, results in a decrease of the transmission power level by 0.8 dB.

In the right part of FIG. 3, the respective base station is assumed not to be the current primary base station. This results in increases of the transmission power levels by 0.5 dB triggered by "TPC up" signals. As indicatied by a reference numeral 37, a "TPC down" signal also results in a decrease of the transmission power level by 0.5 dB.

Figure 4:
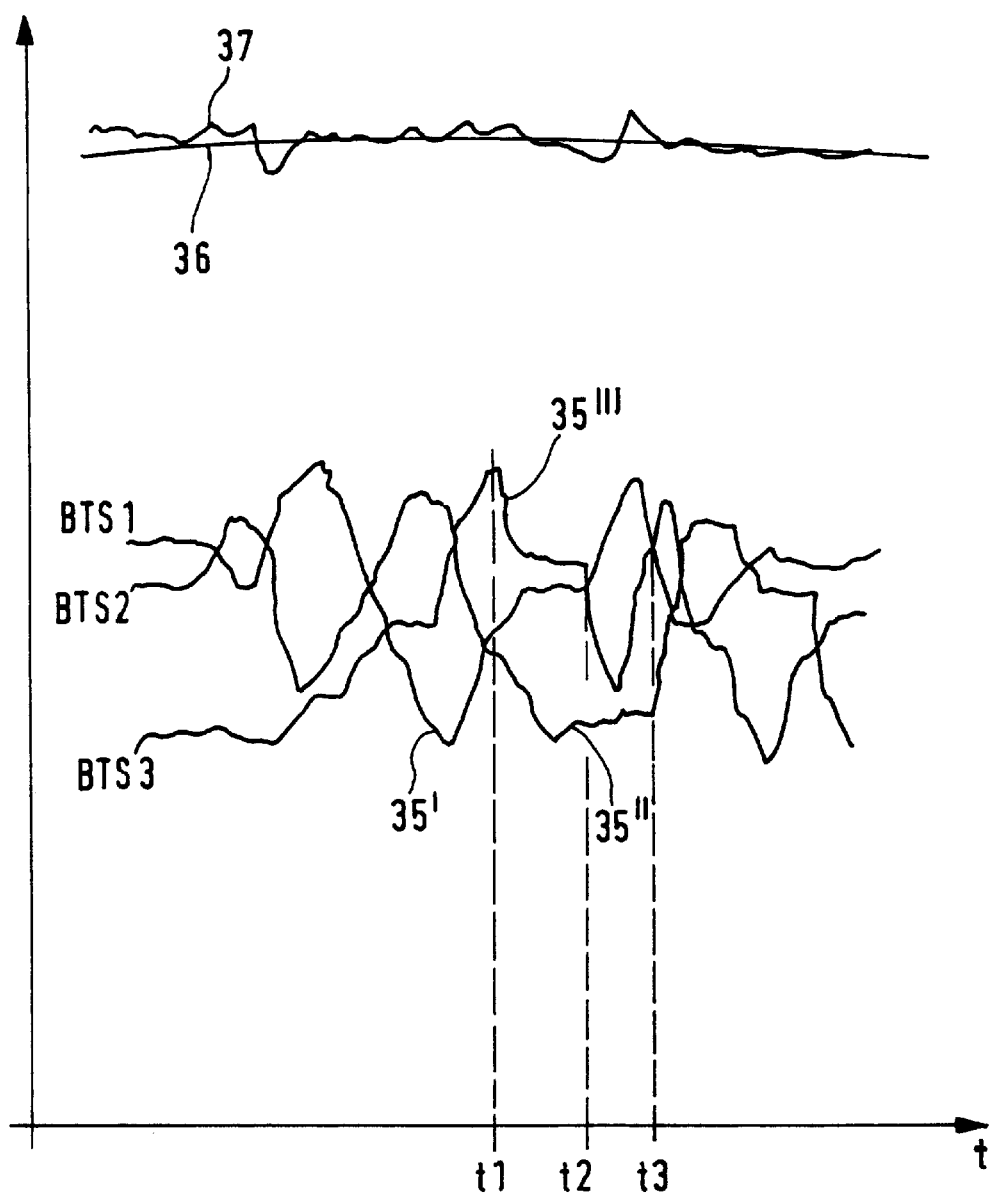
FIG. 4 shows a schematic time diagram of the signal-to-interference ratio (SIR) value of the signal received at a mobile station and the tranmsission power levels of three base stations operating according to the method of FIG. 2.

FIG. 4 shows the consequences of the method described in connection with FIGS. 2 and 3 more generally. For that purpose, FIG. 4 shows the signal-to-interference ratio (SIR) value of the CDMA signal 21 of the mobile station 10 depicted over the time t. Furthermore, the transmission power levels of the CDMA signals 35', 35'', 35''' of the three base stations BTS1, BTS2, BTS3 are depicted over the time t.

As described, one of the base stations BTS1, BTS2, BTS3 is the current primary base station. This has the consequence that the decreases of the transmission power levels of this base station are greater than the decreases of the transmission power levels of the other base stations. At least after a while, this results in the fact that the transmission power level of the current primary base station becomes smaller than the transmission power level of one of the other base stations. As a consequence, this one of the other base stations becomes the new current primary base station.

For example, at a point of time t1 in FIG. 4, the CDMA signal 35''' of the base station BTS3 is received with the highest signal quality by the mobile station 10. The base station BTS3, therefore, is the current primary base station in that point of time t1. As a consequence, the decreases off the transmission power levels of the CDMA signal 35''' due to "TPC down" signals are greater than the decreases of the transmission power levels of the other CDMA signal 35', 35''.

The greater decreases of the transmission power levels of the CDMA signal 35''' lead to a greater decrease of the signal quality of the CDMA signal 19 in total with the result that—at least after a while—the CDMA signal 19 is not received with the highest signal quality anymore by the mobile station 10. Instead, at a point of time t2, the signal quality of the CDMA signal 17 of the base station BTS1 becomes higher than the signal quality of the CDMA signal 19. Therefore, after the point of time t2, the base station BTS1 is the new current primary base station.

As a consequence, the decreases of the transmission power levels of the CDMA signal 35' due to "TPC down" signals are now greater than the decreases of the transmission power levels of the other CDMA signals 35'', 35''' with the result that the base station BTS3 becomes the new current primary base station after a point of time t3.

Summarized, the CDMA signals 35', 35'', 35''' of the base stations BTS1, BTS2, STS3 participate in and perform a kind of "power race" in which anyone of them may become the primary base station. This results in a consecutive change of the primary base station with the effect that the transmission power levels of the three base stations BTS1, BTS2, BTS3 do not drift apart. Instead, these transmission power levels have only small variations above and below a target value 36.

As can be seen in FIG. 4, the combination of the three CDMA signals 35', 35'', 35''' results in the CDMA signal 21 whose SIR value 37 in FIG. 4 is almost constant.

In the above description of FIG. 4, the mentioned target value 36 of the SIR value 37 of the CDMA signal 21 may be controlled in an outer-loop transmission power control method.

Furthermore, in the above description of FIGS. 3 and 4, the decrease of the transmission power level by the greater value V1 may be replaced by an increase of the transmission power level by a smaller value. This means that the power levels of the primary base station are not decreased by a greater value but they are increased by a smaller value than the power levels of the other base stations. At the end, this results in the same kind of "power race" as described in connection with FIG. 4.

As well, it is also possible that the signal quality evaluation circuit 22 is—at least partly—transferred to the base stations BTS1, BTS2, BTS3. In this case, the mobile station 10 only sends signal quality measurement values of the CDMA signals 17, 18, 19 to all base stations BTS1, BTS2, BTS3. These values are compared with each other in each of the base stations BTS1, BTS2, BTS3 and each base station BTS1, BTS2, BTS3 then generates the primary signaling signal itself.

What is claimed is:

1. A method of operating a cellular telecommunication system wherein one mobile station communicates with a number of base stations in a macrodiversity mode, and wherein each of the base stations receives a transmission power control signal from the mobile station requesting an increase or a decrease of the transmission power levels, said method comprising the steps of:

creating a primary signaling signal by the mobile station indicating that one of the base stations from which the mobile station receives a signal with the highest signal quality;

sending the primary signaling signal from the mobile station to the base stations; and changing the transmission power levels of the base stations depending on the primary signaling signal.

2. The method of claim 1, wherein the transmission power level of said base station indicated by the primary signaling signal, is decreased by a greater value than the transmission power level of other base stations.

3. The method of claim 1, wherein the transmission power level of said base station indicated by the primary signaling signal, is increased by a smaller value than the transmission power level of other base stations.

4. The method of claim 1, wherein the primary signaling signal is created by comparing the signals received from the base stations.

5. The method of claim 4, wherein the signals are compared before being combined.

6. The method of claim 1, wherein the frequency of the creation of the primary signaling signal may be lower than the frequency of the creation of the transmission power control signal.

7. A cellular telecommunication system wherein one mobile station communicates with a number of base stations in a macrodiversity mode, and wherein each of the base stations receives a transmission power control signal from the mobile station requesting an increase or a decrease of the transmission power levels, said system comprising means at each mobile station to create a primary signaling signal indicating that one of the base stations from which the mobile station receives a signal with the highest signal quality;

means at each mobile station to send the primary signaling signal to the base stations; and means at each of the base stations to change the transmission power levels of the respective base station depending on the primary signaling signal.

8. The telecommunication system of claim 7, wherein the mobile station comprises a signal quality evaluation circuit to create the primary signaling signal.

9. A method of operating a telecommunications system, comprising:

generating a first control signal in a mobile station, said first control signal being received by a plurality of base stations and controlling a power transmission level of each of said plurality of base stations;

generating a second control signal in said mobile system and receiving said second control signal in said plurality of base stations, said second control signal being indicative of a selection of one of said plurality of base stations; and adjusting a transmission power level of said one of said plurality of said base stations in accordance with said first and second control signals.

10. The method of claim 9, said step of generating said second control signal comprising:

comparing a plurality of input signals received by said mobile station from said corresponding plurality of base stations;

selecting one of said plurality of base stations in accordance with said comparison; and generating said second control signal in accordance with said selection.

11. The method of claim 9, said adjusting step comprising increasing said transmission power level of said one of said plurality of base stations by a lesser magnitude than a transmission power level of others of said plurality of base stations.

12. The method of claim 9, said adjusting step comprising decreasing said transmission power level of said one of said plurality of base stations by a greater magnitude than a transmission power level of others of said plurality of base stations.

13. The method of claim 9, further comprising simultaneously generating said first control signal and said second control signal.

14. The method of claim 13, comprising generating said second control signal at a higher frequency than said first control signal.

15. The method of claim 9, said generating said first control signal and generating said second control signal steps comprising respectively generating a transmission power control signal and a primary signaling signal.

16. A cellular telecommunications system, comprising:
 a mobile station configured to receive input signals and generate a first control signal and a second control signal;
 a plurality of base stations configured to generate said input signals and receive said first control signal and said second control signal, wherein said first control signal is indicative of one of said plurality of signals having a substantially superior signal quality, and said second control signal requests an adjustment in a power level of said plurality of base stations.

17. The cellular telecommunications system of claim 16, said mobile station comprising a signal evaluation circuit that generates said first control signal and said second control signal in accordance with a quality level of each of said input signals.

18. The cellular telecommunications system of claim 17, wherein said signal evaluation circuit simultaneously generates and transmits said first control signal and said second control signal at different frequencies.

19. The cellular telecommunications system of claim 18, wherein said first control signal has a higher frequency than said second control signal.

20. The cellular telecommunications system of claim 16, wherein said first control signal is a transmission power control signal and said second control signal is a primary signaling signal.

* * * * *